(12) United States Patent
Maier

(10) Patent No.: US 9,020,799 B2
(45) Date of Patent: Apr. 28, 2015

(54) ANALYTIC METHOD OF FUEL CONSUMPTION OPTIMIZED HYBRID CONCEPT FOR FUEL CELL SYSTEMS

(75) Inventor: Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 13/396,145

(22) Filed: Feb. 14, 2012

(65) Prior Publication Data

US 2013/0211798 A1    Aug. 15, 2013

(51) Int. Cl.
*H01M 8/04* (2006.01)
*H01M 8/22* (2006.01)
*H01M 8/00* (2006.01)
*B60L 11/18* (2006.01)
*G06F 17/00* (2006.01)
*F02D 41/14* (2006.01)
*G06F 19/00* (2011.01)

(52) U.S. Cl.
CPC ......... *B60L 11/1887* (2013.01); *F02D 41/1406* (2013.01); *G06F 17/00* (2013.01); *H01M 8/04992* (2013.01); *G05B 2219/2668* (2013.01); *H01M 8/04298* (2013.01); *H01M 8/00* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 5,788,004 A * | 8/1998 | Friedmann et al. | 180/65.28 |
| 6,167,339 A * | 12/2000 | Pels | 701/54 |
| 6,201,312 B1 * | 3/2001 | Shioiri et al. | 290/40 C |
| 7,398,147 B2 * | 7/2008 | Kozarekar et al. | 701/101 |
| 7,704,634 B2 * | 4/2010 | Deguchi et al. | 429/105 |
| 2004/0065489 A1 * | 4/2004 | Aberle et al. | 180/65.1 |
| 2006/0052916 A1 * | 3/2006 | Hoch et al. | 701/22 |
| 2006/0087291 A1 * | 4/2006 | Yamauchi | 320/137 |
| 2006/0192523 A1 * | 8/2006 | Nomoto | 320/101 |
| 2007/0284166 A1 * | 12/2007 | Maier et al. | 180/65.3 |
| 2009/0118943 A1 * | 5/2009 | Heap et al. | 701/54 |
| 2009/0258269 A1 * | 10/2009 | Maier et al. | 429/23 |
| 2010/0266921 A1 * | 10/2010 | Maier et al. | 429/432 |
| 2011/0172865 A1 * | 7/2011 | Liang et al. | 701/22 |
| 2012/0095637 A1 * | 4/2012 | Katano | 701/22 |

(Continued)

OTHER PUBLICATIONS

Hawkes, A.D., et-al, "Techno-economic modelling of a solid oxide fuel cell stack for micro combined heat and power," Journal of Power Sources, vol. 156, 2006, pp. 321-333.*

(Continued)

*Primary Examiner* — Aniss Chad
*Assistant Examiner* — David M Rogers
(74) *Attorney, Agent, or Firm* — John A. Miller; Miller IP Group, PLC

(57) ABSTRACT

A method a system and method for optimizing the power distribution between a fuel cell stack and a high voltage battery in a fuel cell vehicle. The method includes defining a virtual battery hydrogen power for the battery that is based on a relationship between a battery power request from the battery and an efficiency of the battery and defining a virtual stack hydrogen power for the fuel cell stack that is based on a relationship between a stack power request from the fuel cell stack and an efficiency of the fuel cell stack. The virtual battery hydrogen power and the virtual stack hydrogen power are converted into polynomial equations and added together to provide a combined power polynomial equation. The combined power polynomial equation is solved to determine a minimum of the fuel cell stack power request by setting a derivative of the virtual stack hydrogen power to zero.

18 Claims, 2 Drawing Sheets

(56) References Cited

U.S. PATENT DOCUMENTS

2014/0244064 A1* 8/2014 Okino et al. ............ 700/297
2014/0308589 A1* 10/2014 Katano et al. ............ 429/400
2014/0330470 A1* 11/2014 Ozaki et al. ............ 701/22

OTHER PUBLICATIONS

Talj, R.J., et-al, "Experimental Validation of a PEM Fuel-Cell Reduced-Order Model and a Moto-Compressor Higher Order Sliding-Mode Control," IEEE Transactions on Industrial Electronics, vol. 57, No. 6, Jun. 2010, pp. 1906-1913.*

Shrestha, S.O., et-al, "Performance and Modeling of a Direct Methanol Fuel Cell," Proceedings of the World Congress on Engineering 2011, Jul. 6-8, 2011, London, U.K., pp. 6 pages.*

Lim, J.G., et al, "Implementation of a Fuel Cell Dynamic Simulator," Journal of Power Electronics, vol. 7, No. 4, Oct. 2007.*

A. Al Durra, et al., "On the Control of Automotive Traction FEM Fuel Cell Systems," in "New Trends and Developments in Automotive System Engineering," Marcello Chiaberge, ed., ISBN 978 953 307 517 4, published Jan. 8, 2011, pp. 309 342.*

* cited by examiner

ANALYTIC METHOD OF FUEL CONSUMPTION OPTIMIZED HYBRID CONCEPT FOR FUEL CELL SYSTEMS

BACKGROUND OF THE INVENTION

1. Field of the Invention

This invention relates generally to a system and method for optimizing the power distribution between a fuel cell stack and a high voltage battery and, more particularly, to a system and method that optimizes the power distribution between a fuel cell stack and a high voltage battery on a fuel cell vehicle to conserve hydrogen fuel, where the method includes modeling the distribution of power using polynomial equations and minimizing a solution to those equations.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Most fuel cell vehicles are hybrid vehicles that employ a supplemental power source in addition to the fuel cell stack, such as a high voltage DC battery or an ultracapacitor. A bi-directional DC/DC converter is sometimes employed to match the battery voltage to the voltage of the fuel cell stack. The power source provides supplemental power for the various vehicle auxiliary loads, for system start-up and during high power demands when the fuel cell stack is unable to provide the desired power. The fuel cell stack provides power to an electrical traction motor through a DC high voltage electrical bus for vehicle operation. The battery provides supplemental power to the electrical bus during those times when additional power is needed beyond what the stack can provide, such as during heavy acceleration. For example, the fuel cell stack may provide 70 kW of power, however, vehicle acceleration may require 100 kW of power. The fuel cell stack is used to recharge the battery or ultracapacitor at those times when the fuel cell stack is able to provide the system power demand. The generator power available from the traction motor during regenerative braking is also used to recharge the battery or ultracapacitor.

It is necessary to provide control algorithms to determine how much power will be provided by the fuel cell stack and how much power will be provided by the battery in response to a driver power request and under all vehicle operating conditions. The battery must be operated within a known state-of-charge (SOC) range, where the control algorithms typically provide a SOC set-point to which the battery charge and discharge is controlled based on that set-point. It is desirable to optimize the power distribution provided by the fuel cell stack and the battery so that the amount of hydrogen used to operate the vehicle is minimized. In other words, it is desirable to operate the fuel cell system in the most efficient manner that allows the vehicle to travel the farthest distance using the least amount of hydrogen. Known control algorithms for controlling the power distribution considered this optimization, but were typically more interested in battery durability and reliability.

SUMMARY OF THE INVENTION

In accordance with the teachings of the present invention, a system and method are disclosed for optimizing the power distribution between a fuel cell stack and a high voltage battery in a fuel cell vehicle. The method includes defining a virtual battery hydrogen power for the battery that is based on a relationship between a battery power request from the battery and an efficiency of the battery and defining a virtual stack hydrogen power for the fuel cell stack that is based on a relationship between a stack power request from the fuel cell stack and an efficiency of the fuel cell stack. The virtual battery hydrogen power and the virtual stack hydrogen power are converted into polynomial equations and added together to provide a combined power polynomial equation. The combined power polynomial equation is solved to determine a minimum of the fuel cell stack power request by setting a derivative of the virtual stack hydrogen power to zero. The stack power request is then subtracted from a desired driver power request to obtain the battery power request.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining the power distribution provided by a fuel cell stack and a battery in a fuel cell vehicle to minimize hydrogen consumption is merely exemplary in nature, and is in no way intended to limit the invention or its applications or uses. For example, as discussed, the present invention has particular application for a fuel cell system on a vehicle. However, as will be appreciated by those skilled in the art, the system and method of the invention may have other applications.

Figure 1:
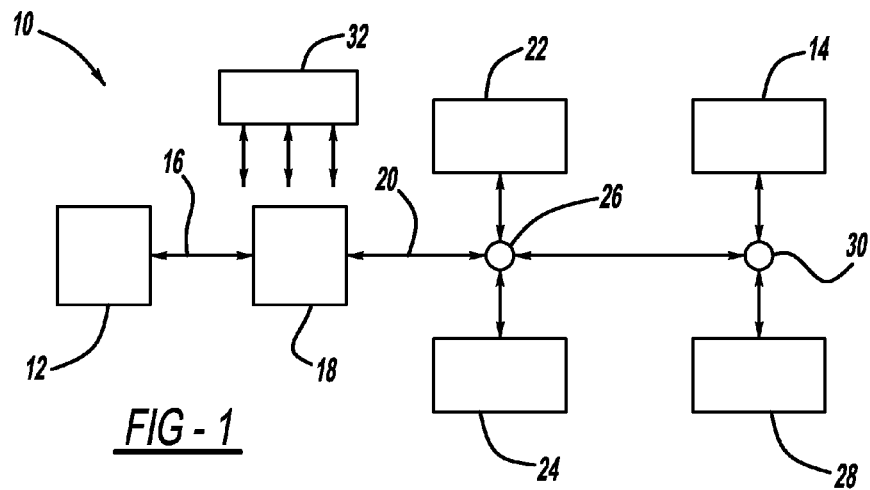
FIG. 1 is a schematic block diagram of fuel cell system including fuel cell stack and high voltage battery.

FIG. 1 is a schematic block diagram of a fuel cell system 10 including a fuel cell stack 12 and a high voltage battery 14. The battery 14 can be any suitable rechargeable battery system that provides various desirable charging and discharging characteristics for fuel cell system applications, including, but not limited to, lithium-ion batteries, Ni-MH batteries, sodium-nickel-chloride batteries, lead-acid batteries, nickel-cadmium batteries, etc. Although the battery 14 is employed in this non-limiting embodiment as a supplemental power source, other high voltage DC storage devices can be employed instead of the battery 14, such as an ultracapacitor.

The fuel cell stack 12 and the battery 14 may have different output voltages depending on their design and the load current. A DC/DC boost converter 18 provides voltage matching between the stack 12 and the battery 14, and provides current control that selectively determines how much power is provided by the stack 12 to drive the various loads and an electric traction motor 28 for the changing fuel cell system conditions and driver power requests.

In this design, the fuel cell stack 12 is electrically coupled to the DC/DC boost converter 18 by a stack bus 16 and the DC/DC boost converter 18 is coupled to the high voltage battery 14 by a high voltage bus 20. The various high voltage components of the system 10 are electrically coupled to the high voltage bus 20 between the boost converter 18 and the battery 14. Particularly, an air compressor 22 for providing an airflow to the cathode side of the fuel cell stack 12 and miscellaneous system loads 24 are electrically coupled to the high voltage bus 20 at node 26. Further, the electric traction motor 28, along with the high voltage battery 14, are electrically coupled to the high voltage bus 20 at node 30. A system controller 32 controls the DC/DC boost converter 18 to provide the voltage matching between the stack 12 and the battery 14, and optimizes the power distribution between the stack 12 and the battery 14 to minimize the hydrogen consumption consistent with the discussion herein.

As will be discussed in detail below, the present invention proposes a control scheme for a power optimizer that determines how much power is to be provided by the fuel cell stack 12 and how much power is to be provided by the high voltage battery 14 for a particular driver power request so that the amount of hydrogen that is consumed is minimized. The power optimizer is based on efficiency tables for the fuel cell stack 12 and the high voltage battery 14. At a given driver power request $P_{Driver,req}$, the optimizer calculates the optimal power distribution between the stack 12 and the battery 14. As will be discussed, for analytic evaluation, the efficiency tables are transformed into polynomial equations. The calculations define the power provided by the stack 12 as a virtual stack hydrogen power $P_{H_2,FCS}$ and the power provided by the battery 14 as a virtual battery hydrogen power $P_{H_2,Bat}$. As will be discussed, the polynomial equations are solved to determine a stack power request $P_{FCS,req}$ and then that power is subtracted from the driver power request $P_{Driver,req}$, including other factors discussed below, to obtain a battery power request $P_{Bat,req}$.

Equation (1) shows an operation for battery discharge.

$$P_{H_2} = P_{H_2,Bat} + P_{H_2,FCS} = \frac{P_{Bat,req}}{\eta_{Bat}(P_{Bat})} + \frac{P_{FCS,req}}{\eta_{FCS}(P_{FCS})} = \frac{(P_{Driver,req} - P_{FCS,req})}{\eta_{Bat}(P_{Bat})} + \frac{P_{FCS,req}}{\eta_{FCS}(P_{FCS})} \quad (1)$$

Where $P_{H_2}$ is the combined hydrogen power being used, $P_{H_2,Bat}$ is the virtual hydrogen power for the battery 14, $P_{H_2,FCS}$ is the virtual hydrogen power for the stack 12, $P_{Bat,req}$ is the power requested from the battery 14, $P_{FCS,req}$ is the power requested from the fuel cell stack 12, $P_{Driver,req}$ is the power requested by the vehicle driver, $\eta_{Bat}$ is the battery efficiency and $\eta_{FCS}$ is the fuel cell stack efficiency. The battery 14 can be either charged or discharged, and for those cases where the battery 14 is being charged, the battery power request $P_{Bat,req}$ is multiplied by the battery efficiency $\eta_{Bat}$ and for those cases where the battery 14 is being discharged, the battery power request $P_{Bat,req}$ is divided by the battery efficiency $\eta_{Bat}$.

Examples of the power distribution between the stack 12 and the battery 14 based on equation (1) are shown in Table I below. In Table I, the second row shows a 50 kW power request $P_{Driver,req}$ from the driver, where 40 kW of power $P_{FCS,req}$ is provided by the stack 12 and 10 kW of power $P_{Bat,req}$ is provided by the battery 14. In the fourth and fifth columns, those powers are divided by the efficiencies η and added to get the combined hydrogen power $P_{H_2}$ in the sixth column. The third and fourth rows provide different power distributions between the fuel cell stack 12 and the battery 14 for the same driver power request $P_{Driver,req}$ of 50 kW, where the fourth row shows that the stack 12 is providing 10 kW of power to charge the battery 14. For this particular example, the second row provides the best power distribution between the stack 12 and the battery 14 for a minimum of the combined power $P_{H_2}$.

TABLE I

| $P_{Driver,req}$ | $P_{FCS,req}$ | $P_{Bat,req}$ | $P_{H_2,FCS}$ | $P_{H_2,Bat}$ | $P_{H_2}$ |
|---|---|---|---|---|---|
| 50 [kW] | 40 [kW] | 10[kW] discharge | 40/0.5 [kW] = 80 [kW] | 10/0.9 [kW] = 11.1 [kW] | 91.1 [kW] |
| 50 [kW] | 50 [kW] | 0 [kW] | 50/0.5 [kW] = 100 [kW] | 0 [kW] | 100 [kW] |

TABLE I-continued

| $P_{Driver,req}$ | $P_{FCS,req}$ | $P_{Bat,req}$ | $P_{H_2,FCS}$ | $P_{H_2,Bat}$ | $P_{H_2}$ |
|---|---|---|---|---|---|
| 50 [kW] | 60 [kW] | −10 [kW] charge | 60/0.5 [kW] = 120 [kW] | −10 * 0.9 [kW] = −9 [kW] | 111 [kW] |

Figure 2:
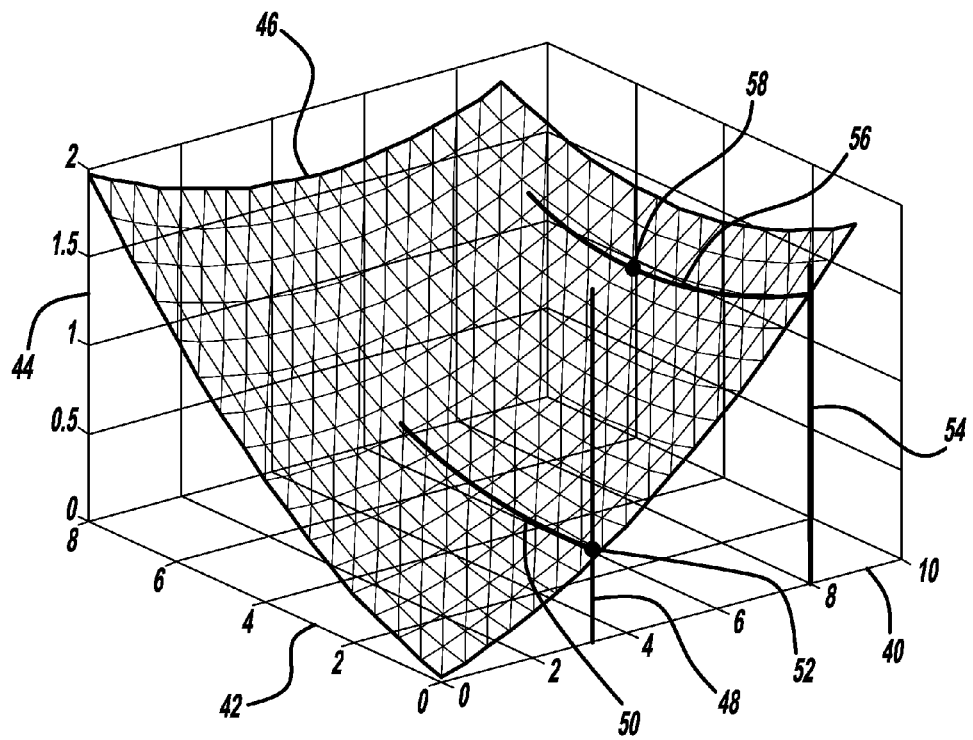
FIG. 2 is a graph showing a relationship between a driver power request, a fuel cell stack power and a combined battery and fuel cell stack power.

FIG. 2 is a graph showing how the distribution of the combined power $P_{H_2}$ between the stack 12 and the battery 14 can be optimized to a minimum based on equation (1). In this graph, the driver power request $P_{Driver,req}$ is on axis 40 where each number is times $10^4$, the virtual stack hydrogen power $P_{H_2,FCS}$ is on axis 42 where each number is times $10^4$ and the combined power $P_{H_2}$ is on axis 44 where each number is times $10^5$. Surface 46 defines all of the power distribution relationships between the virtual stack hydrogen power $P_{H_2,FCS}$ and the virtual battery hydrogen power $P_{H_2,Bat}$ for the entire system power range. The graph shows two examples for determining the minimum power for two different driver power requests $P_{Driver,req}$. Particularly, line 48 represents a driver power request $P_{Driver,req}$ of 32 kW and line 50 represents all of the combinations of the virtual stack power $P_{H_2,FCS}$ and the virtual battery power $P_{H_2,Bat}$ that can be provided for that request. The line 50 increases from point 52 and as such, the point 52 is the lowest or minimum point on the line 50, which is at the edge of the surface 46 and represents 0 kW of stack power $P_{H_2,FCS}$. Therefore, the optimized power for a 32 kW driver power request $P_{Driver,req}$ would be provided entirely by the battery 14.

Line 54 represents a driver power request $P_{Driver,req}$ of 80 kW, and line 56 represents all of the combinations of the virtual stack hydrogen power $P_{H_2,FCS}$ and the virtual battery hydrogen power $P_{H_2,Bat}$ for that power request. The line 58 is not linear, and the minimum combined power $P_{H_2}$ is at point 58, which represents a stack power $P_{H_2,FCS}$ of 40 kW and a battery power $P_{H_2,Bat}$ also of 40 kW. This graph shows that for the optimization provide by equation (1), all driver power requests $P_{Driver,req}$ of 32 kW or less should be provided entirely by the battery 14 and all driver power requests $P_{Driver,req}$ greater than 32 kW would be some combination of stack power $P_{H_2,FCS}$ and battery power $P_{H_2,Bat}$.

All combinations of the power outputs from the stack 12 and the battery 14 can be determined for each driver power request $P_{Driver,req}$ and from the above relationship, the optimal combined power $P_{H_2}$ can be determined and those power requests can be assigned to that minimum. However, providing all of these values and combinations of powers for each driver power request $P_{Driver,req}$ requires more memory than would be available on the vehicle. Therefore, a reduction in the calculation and memory requirements needs to be provided. The discussion below provides one way in which the minimum of the combined power $P_{H_2}$ value can be determined with reduced memory.

According to the invention, equation (1) is converted to a polynomial equation that can be solved to provide minimum values for the combined hydrogen power $P_{H_2}$ at each time step for each driver power request $P_{Driver,req}$. As will be discussed, the polynomial equation will be solved to determine the minimum for the fuel cell stack power request $P_{FCS,req}$ for a particular driver power request $P_{Driver,req}$, and then the difference between the driver power request $P_{Driver,req}$ and the minimum stack power request $P_{FCS,req}$ will be the battery power request $P_{Bat,req}$. In order to solve for the minimum of the stack power request $P_{FCS,req}$, the battery power request $P_{Bat,req}$ is replaced in the polynomial equation with the difference between the driver power request $P_{Driver,req}$ and the stack power request $P_{FCS,req}$.

Equation (2) below shows this polynomial equation, where the part of equation (2) including the coefficients A, B and C is for the virtual battery power $P_{H_2,Bat}$, and is a second order polynomial, and the part of equation (2) including the coefficients D, E, F and G is for the virtual stack power $P_{H_2,FCS}$ and is a third order polynomial. It is noted that for the part of equation (2) defining the virtual battery power $P_{H_2,Bat}$, the coefficients A, B and C are one value for when the battery 14 is charging and another value for when the battery 14 is discharging.

$$P_{H_2} = A*(P_{Driver,req} - P_{FCS,req})^2 + B*(P_{Driver,req} - P_{FCS,req}) + \quad (2)$$
$$C + D*P_{FCS,req}^3 + E*P_{FCS,req}^2 + F*P_{FCS,req} + G$$

Where:

$$P_{Bat,req} = P_{Driver,req} - P_{FCS,req} \quad (3)$$

The minimum of the virtual stack hydrogen power $P_{H_2,FCS}$ can be provided by deriving the virtual stack hydrogen power $P_{H_2,FCS}$ and setting that derivative to zero as:

$$\dot{P}_{H_2,FCS} = 3*D*P_{FCS,req}^2 + \quad (4)$$
$$(2*A + 2*E)*P_{FCS,req} + (F - B - 2*A*P_{Driver,req}) = 0$$

Because equation (4) includes a square term, it is a quadratic equation that provides two solutions. These two solutions are shown in equations (5) and (6) below. It is noted that because the coefficients A, B and C are different depending on whether the battery 14 is charging or discharging, there are two solutions for both the charge case and the discharge case.

$$P_{FCS1} = -1/3*(E + A - (E^2 + 2*E*A + A^2 + \quad (5)$$
$$6*D*A*P_{Driver,req} - 3*D*F + 3*D*B)^{1/2})/D$$

$$P_{FCS2} = -1/3*(E + A + (E^2 + 2*E*A + A^2 + \quad (6)$$
$$6*D*A*P_{Driver,req} - 3*D*F + 3*D*B)^{1/2})/D$$

Figure 3:
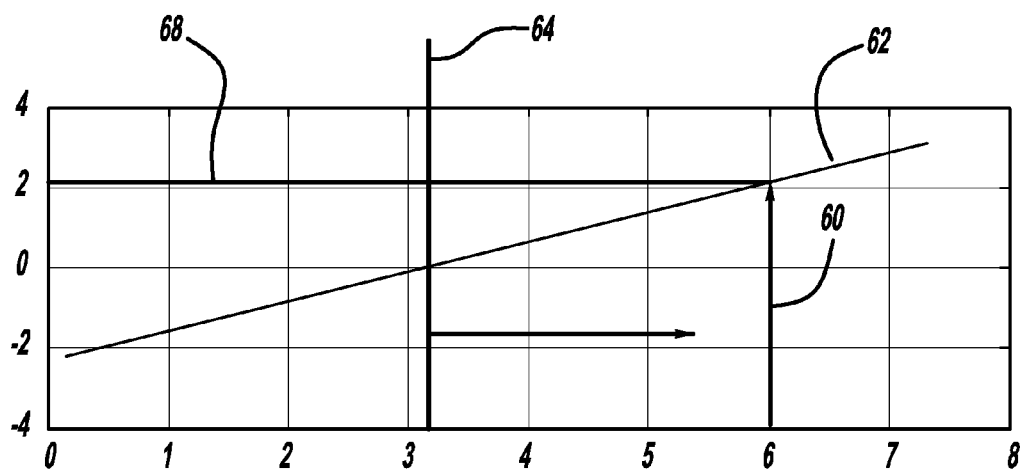
FIG. 3 is a graph with fuel cell system power request on the horizontal axis and fuel cell system minimum power on the vertical axis.

The relationship between the driver power request $P_{Driver,req}$ and the minimum stack power $P_{H_2,FCS}$ is determined by equation (4) and the solutions to equations (5) and (6). The result of that mapping can show whether the values obtained make sense for a fuel cell stack power output in a fuel cell system. Based on this determination, it was found that in most cases only one of those four solutions is out of the systems power range, and is thus not usable. The solution to equation (4) that is proper is shown graphically in FIG. 3, where the driver power request $P_{Driver,req}$ is on the horizontal axis and the minimum of the stack power $P_{H_2,FCS}$ is on the vertical axis. Line 62 represents a usable the solution to the quadratic equation (4), namely equation (6), and the line 62 crosses the zero stack power line at about 32 kW at line 64, which is the same value discussed above for FIG. 2. Thus, for driver power requests $P_{Driver,req}$ that are greater than 32 kW, there is a combination of battery power and stack power that can be optimized by identifying the minimum stack power for a particular power request $P_{Driver,req}$, and then providing the difference therebetween with battery power. For example, if the driver requests 60 kW, as shown by line 66, then the minimum hydrogen used by the stack 12 would provide about 21 kW as indicated by line 70, and the battery 14 would provide the difference of about 39 kW.

The coefficients A, B and C for the virtual battery power $P_{H_2,BAT}$ are determined by mapping the relationship between the driver power request $P_{Driver,req}$ and the virtual battery power $P_{H_2,Bat}$ that satisfies that power request $P_{Driver,req}$ where the calculation considers the efficiency $\eta_{Bat}$ of the battery 14. Likewise, the coefficients D, E, F and G for the virtual stack hydrogen power $P_{H_2,FCS}$ are determined by mapping the relationship between the driver power request $P_{Driver,req}$ and the virtual stack power $P_{H_2,FCS}$ that satisfies that driver power request $P_{Driver,req}$, where the calculation considers the efficiency $\eta_{FCS}$ of the fuel cell stack 12. Because the battery and stack efficiencies $\eta$ change over time as the battery 14 and the stack 12 age and degrade, and that this efficiency is also dependent on temperature, the calculation of these solutions for the polynomial equation (4) to determine the minimum of the combined power $P_{H_2}$ is performed in real time during operation of the vehicle and at every predetermined time step. However, because the solution and calculations for equation (4) is minimal, the memory required to perform this calculation is also minimal.

As discussed above, the power optimizer generally tries to discharge the battery 14 to provide the power optimization. However, the battery state-of-charge (SOC) must remain within an allowable SOC range, which has a minimum battery SOC. Typically, the SOC of a battery for a fuel cell system is controlled to some battery SOC set-point. For example, some battery charge must be maintained in the event that the driver provides a high power request that cannot be satisfied by the stack 12 alone. In order to consider this requirement, the present invention proposes an SOC controller used in conjunction with the power optimizer that prevents the battery SOC from dropping too far below a battery SOC set-point. Particularly, the output of the SOC controller is added to the driver power request $P_{Driver,req}$ so that if battery charging is needed, a higher power is requested and the excess requested power is used for battery charging to increase the battery SOC.

The compressor 22 that provides the cathode air operates off of stack power. Therefore, it may be desirable to add the power required for compressor operation to the driver power request $P_{Driver,req}$ to satisfy this load. If the difference between the fuel cell stack power $P_{FCS}$ at time step n and the stack power $P_{FCS}$ at time step n−1 is greater zero, then the derivative of that difference is multiplied by a weighting factor K to define the power $P_{cmpr,acc}$ necessary to accelerate the compressor 22. If the difference between the stack power $P_{FCS}$ at time step n and time step n−1 is less than zero, then the compressor acceleration power $P_{cmpr,acc}$ is set to zero. This is shown in equations (7) and (8) below.

$$P_{cmpr,acc} = \frac{P_{FCS,n} - P_{FCS,n-1}}{dt} * K \quad \text{for}(P_{FCS,n} - P_{FCS,n-1}) > 0 \quad (7)$$

$$P_{cmpr,acc} = 0 \quad \text{for}(P_{FCS,n} - P_{FCS,n-1}) \leq 0 \quad (8)$$

Figure 4:
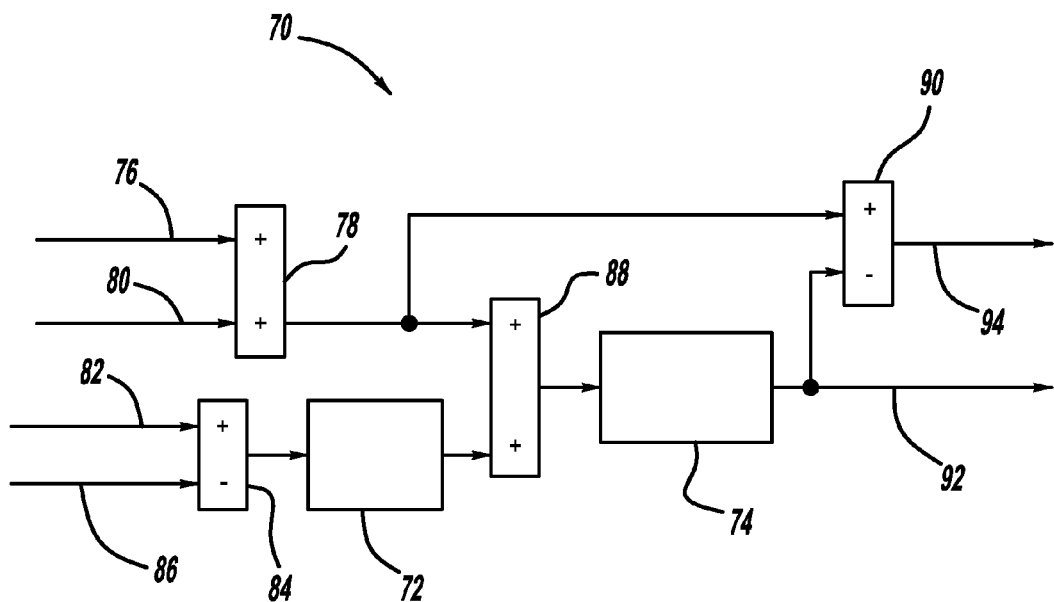
FIG. 4 is a block diagram of a power control system for providing power distribution signals for a battery and a fuel cell stack that includes a power optimizer and a battery state-of-charge controller.

FIG. 4 is a block diagram of a power control system 70 including an SOC controller 72 used in conjunction with a power optimizer 74 that operates in the manner discussed above. The driver power request $P_{Driver,req}$ on line 76 and the compressor power $P_{cmpr,acc}$ on line 80 are provided to an adder 78 to obtain a modified power request signal at the output of the adder 78 to consider the compressor power draw. The desired battery SOC set-point is provided on line 82 and the actual battery SOC is provided on line 86 to a subtractor 84, and the difference between the SOC set-point and the actual SOC is provided to the SOC controller 72 that generates a power request signal that is added to the modified power request signal from the adder 78 in an adder 88. The SOC controller 72 converts the difference between the actual SOC and the SOC set-point to a power signal. Therefore, if the actual battery SOC is less than the SOC set-point, the SOC controller 72 will add power to the modified power request signal in the adder 88 to charge the battery 14, and if the actual battery SOC is greater than the battery SOC set-point, the SOC controller 72 will provide a negative power signal to the adder 88 to reduce the modified power request signal so that more battery power is used than would normally be used for the power optimization to discharge the battery 14 to the battery SOC set-point. Thus, the battery SOC control provides a trade off to the optimization. The optimizer 74 generates the stack power request $P_{FCS,req}$ as discussed above on line 92, which is subtracted from the modified power request signal in a subtractor 90 to provide the battery power request $P_{Bat,req}$ on line 94.

If the output of the power optimizer 74, i.e., the stack power request $P_{FCS,req}$ is lower than a defined power limit for a predetermined period of time, the stack 12 can be switched off to conserve fuel.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for optimizing a power output distribution between a fuel cell stack and a battery in a fuel cell system, said method comprising:
   identifying a desired power request;
   defining a virtual battery hydrogen power for the battery that is based on a relationship between a battery power request from the battery and an efficiency of the battery;
   defining a virtual stack hydrogen power for the fuel cell stack that is based on a relationship between a stack power request from the fuel cell stack and an efficiency of the fuel cell stack;
   converting the virtual battery hydrogen power to a battery polynomial equation;

converting the virtual stack hydrogen power to a stack polynomial equation;
adding the battery polynomial equation and the stack polynomial equation to obtain a combined power polynomial equation;
solving the combined power polynomial equation to determine a minimum of the stack power request by setting a derivative of the virtual stack hydrogen power to zero;
subtracting the stack power request from the desired power request to obtain the battery power request; and
adding a compressor acceleration power signal for controlling a cathode compressor to the desired power request if a stack power at a current time step is greater than a stack power at a previous time step.

2. The method according to claim 1 wherein converting the virtual battery hydrogen power to a battery polynomial equation includes determining the battery polynomial equation as a second order polynomial equation including three coefficients.

3. The method according to claim 2 wherein determining the battery polynomial equation includes defining the three coefficients based on a relationship between the desired power request and the virtual battery hydrogen power.

4. The method according to claim 1 wherein converting the virtual stack hydrogen power to a stack polynomial equation includes determining the stack polynomial equation as a third order polynomial equation including four coefficients.

5. The method according to claim 4 wherein determining the stack polynomial equation includes defining the four coefficients based on a relationship between the desired power request and the virtual stack hydrogen power.

6. The method according to claim 1 wherein converting the virtual battery hydrogen power to a battery polynomial equation includes replacing the battery power request with a difference between the desired power request and the stack power request.

7. The method according to claim 1 wherein converting the virtual battery hydrogen power to a battery polynomial equation includes converting the virtual battery hydrogen power to one battery polynomial equation if the battery is being charged and converting the virtual battery hydrogen power to another battery polynomial equation if the battery is being discharged.

8. The method according to claim 1 further comprising identifying a desired battery state-of-charge (SOC) set-point, generating an SOC error between the desired battery SOC set-point and an actual battery SOC, converting the SOC error to an SOC power signal, adding the SOC power signal to the desired power request to increase the desired power request if the actual SOC is less than the SOC set-point and decreasing the desired power request if the actual SOC is greater than the SOC set-point.

9. The method according to claim 1 wherein the fuel cell system is on a vehicle.

10. A method for optimizing a power output distribution between a fuel cell stack and a battery in a fuel cell system, said method comprising:
identifying a desired power request;
defining a virtual battery hydrogen power for the battery that is based on a relationship between a battery power request from the battery and an efficiency of the battery;
defining a virtual stack hydrogen power for the fuel cell stack that is based on a relationship between a stack power request from the fuel cell stack and an efficiency of the fuel cell stack;
converting the virtual battery hydrogen power to a battery polynomial equation;
converting the virtual stack hydrogen power to a stack polynomial equation;
adding the battery polynomial equation and the stack polynomial equation to obtain a combined power polynomial equation;
solving the combined power polynomial equation to determine a minimum of the stack power request and the battery power request; and
adding a compressor acceleration power signal for controlling a cathode compressor to the desired power request if a stack power at a current time step is greater than a stack power at a previous time step.

11. An optimization system for optimizing a power output distribution between a fuel cell stack and a battery in a fuel cell system, said optimization system comprising:
a controller programmed to provide:
means for identifying a desired power request;
means for defining a virtual battery hydrogen power for the battery that is based on a relationship between a battery power request from the battery and an efficiency of the battery;
means for defining a virtual stack hydrogen power for the fuel cell stack that is based on a relationship between a stack power request from the fuel cell stack and an efficiency of the fuel cell stack;
means for converting the virtual battery hydrogen power to a battery polynomial equation;
means for converting the virtual stack hydrogen power to a stack polynomial equation;
means for adding the battery polynomial equation and the stack polynomial equation to obtain a combined power polynomial equation;
means for solving the combined power polynomial equation to determine a minimum of the fuel cell stack power request by setting derivative of the virtual stack hydrogen power to zero;
and means for subtracting the stack power request from the desired power request to obtain the battery power request; and
means for adding a compressor acceleration power signal for controlling a cathode compressor to the desired power request if a stack power at a current time step is greater than a stack power at a previous time step.

12. The optimization system according to claim 11 wherein the means for converting the virtual battery hydrogen power to a battery polynomial equation includes means for determining the battery polynomial equation as a second order polynomial equation including three coefficients.

13. The optimization system according to claim 12 wherein determining the battery polynomial equation includes defining the three coefficients based on a relationship between the desired power request and the virtual battery hydrogen power.

14. The optimization system according to claim 11 wherein the means for converting the virtual stack hydrogen power to a stack polynomial equation includes means for determining the stack polynomial equation as a third order polynomial equation including four coefficients.

15. The optimization system according to claim 14 wherein the means for determining the stack polynomial equation includes defining the four coefficients based on a relationship between the desired power request and the virtual stack hydrogen power.

16. The optimization system according to claim 11 wherein the means for converting the virtual battery hydrogen power to a battery polynomial equation includes replacing the battery power request with a difference between the desired power request and the stack power request.

17. The optimization system according to claim 11 wherein the means for converting the virtual battery hydrogen power to a battery polynomial equation includes converting the virtual battery hydrogen power to one battery polynomial equation if the battery is being charged and converting the virtual battery hydrogen power to another battery polynomial equation if the battery is being discharged.

18. The optimization system according to claim 11 further comprising means for identifying a desired battery state-of-charge (SOC) set-point, generating an SOC error between the desired battery SOC set-point and an actual battery SOC, converting the SOC error to an SOC power signal, adding the SOC power signal to the desired power request to increase the desired power request if the actual SOC is less than the SOC set-point and decreasing the desired power request if the actual SOC is greater than the SOC set-point.

* * * * *